(12) United States Patent
Kubota et al.

(10) Patent No.: US 10,661,544 B2
(45) Date of Patent: May 26, 2020

(54) APPLICATION METHOD FOR A FILM

(71) Applicant: 3M INNOVATIVE PROPERTIES COMPANY, St. Paul, MN (US)

(72) Inventors: Masayuki Kubota, Kanagawa (JP);
Taishi Tokunaga, Kanagawa (JP);
Takayoshi Fujino, Kanagawa (JP);
Katsunori Sakai, Kanagawa (JP);
Hiroki Wakamatsu, Kanagawa (JP)

(73) Assignee: 3M Innovative Properties, Inc., St. Paul, MN (US)

( * ) Notice: Subject to any disclaimer, the term of this patent is extended or adjusted under 35 U.S.C. 154(b) by 0 days.

(21) Appl. No.: 15/124,777

(22) PCT Filed: Mar. 9, 2015

(86) PCT No.: PCT/US2015/019415
§ 371 (c)(1),
(2) Date: Sep. 9, 2016

(87) PCT Pub. No.: WO2015/138304
PCT Pub. Date: Sep. 17, 2015

(65) Prior Publication Data
US 2017/0015090 A1    Jan. 19, 2017

(30) Foreign Application Priority Data

Mar. 14, 2014 (JP) ................................. 2014-052292
Dec. 24, 2014 (JP) ................................. 2014-260415

(51) Int. Cl.
*B29C 63/02* (2006.01)
*B32B 37/10* (2006.01)
(Continued)

(52) U.S. Cl.
CPC .......... *B32B 37/10* (2013.01); *B29C 63/0004* (2013.01); *B29C 63/02* (2013.01);
(Continued)

(58) Field of Classification Search
None
See application file for complete search history.

(56) References Cited

U.S. PATENT DOCUMENTS 4,150,183 A * 4/1979 Reed .................... B31D 1/021
                                                        206/820
4,174,994 A * 11/1979 Savelkouls ......... B29C 63/0004
                                                        156/389

(Continued)

FOREIGN PATENT DOCUMENTS

CN    201841729    5/2011
CN    103029409    4/2013

(Continued)

OTHER PUBLICATIONS

International Search Report for PCT International Application No. PCT/US2015/019415 dated Jun. 23, 2015, 4 pages.

(Continued)

*Primary Examiner* — Barbara J Musser
(74) *Attorney, Agent, or Firm* — Philip P. Soo

(57) ABSTRACT

An application method of applying a film F having a main portion 71, an extended portion 72 connected to a first end 71x of the main portion 71, and an extended portion 73 connected to a second end 71y opposing the first end 71x in the main portion 71 to a base material by an application device having an application mechanism, including the steps of: pressing the extended portion 72 using the application mechanism; applying the main portion 71 to the base material by moving the application mechanism that presses the extended portion 72 from the extended portion 72 to the extended portion 73 via the main portion 71; and stopping the application mechanism moved to the extended portion 73 and separating the application mechanism from the extended portion 73.

4 Claims, 11 Drawing Sheets

(51) Int. Cl.
  *B29C 63/00* (2006.01)
  *B29C 65/48* (2006.01)
  *B32B 7/12* (2006.01)
  *B32B 37/12* (2006.01)
  *B29L 31/30* (2006.01)

(52) U.S. Cl.
  CPC ............ *B29C 65/4825* (2013.01); *B32B 7/12* (2013.01); *B32B 37/12* (2013.01); *B29C 2063/027* (2013.01); *B29L 2031/3011* (2013.01); *B29L 2031/3055* (2013.01); *B32B 2307/412* (2013.01); *B32B 2605/003* (2013.01)

(56) References Cited

U.S. PATENT DOCUMENTS

| | | | |
|---|---|---|---|
| 6,863,107 B2 * | 3/2005 | Hein | ............. B31F 1/07 |
| | | | 156/459 |
| 7,611,600 B2 | 11/2009 | Tsujimoto | |
| 7,686,910 B2 | 3/2010 | Habisreitinger et al. | |
| 7,726,696 B2 * | 6/2010 | Flynn | ............. B42D 15/045 |
| | | | 283/101 |
| 8,535,035 B2 | 9/2013 | Mori | |
| 8,784,599 B2 | 7/2014 | Sun | |
| 2002/0074090 A1 | 6/2002 | Osumi | |
| 2006/0151085 A1 | 7/2006 | Habisreitinger | |
| 2006/0182951 A1 | 8/2006 | Morisaki | |
| 2007/0227645 A1 * | 10/2007 | Habisreitinger | ........ B29C 63/02 |
| | | | 156/160 |
| 2009/0096965 A1 | 4/2009 | Nagata | |
| 2014/0338829 A1 * | 11/2014 | Peng | ............. B29C 63/0004 |
| | | | 156/249 |
| 2017/0015090 A1 | 1/2017 | Kubota | |

FOREIGN PATENT DOCUMENTS

| | | |
|---|---|---|
| CN | 104129144 | 11/2014 |
| EP | 1606365 | 12/2005 |
| JP | H1-165218 | 11/1989 |
| JP | H4-30935 | 3/1992 |
| JP | H06238753 | 8/1994 |
| JP | H6-255063 | 9/1994 |
| JP | 6-286928 | 10/1994 |
| JP | H7-037621 | 7/1995 |
| JP | H10-35612 | 2/1998 |
| JP | 2000-160115 | 6/2000 |
| JP | 2010-054675 | 3/2010 |
| JP | 2010-224110 | 10/2010 |
| JP | 2013-95006 | 5/2013 |
| KR | 101252750 | 4/2013 |
| WO | WO 2005/021241 | 3/2005 |

OTHER PUBLICATIONS

U.S. Appl. No. 14/975,960 Restriction Requirement dated Mar. 30, 2018 (8 pages).
U.S. Appl. No. 14/975,960 OA 892 1449 dated Aug. 27, 2018 (12 pages).
U.S. Appl. No. 14/975,960 Final OA 892 1449 dated Jan. 25, 2019 (20 pages).

* cited by examiner

APPLICATION METHOD FOR A FILM

CROSS REFERENCE TO RELATED APPLICATIONS

This application is a national stage filing under 35 U.S.C. 371 of PCT/US2015/019415, filed Mar. 9, 2015, which claims the benefit of Japan Application No. 2014-052292, filed Mar. 14, 2014, and which also claims the benefit of Japan Application No. 2014-260415, filed Dec. 24, 2014, the disclosures of which are incorporated by reference in their entireties herein.

FIELD OF THE INVENTION

One form of the present invention relates to a method of applying a film to relatively wide surfaces, and to a film such as, e.g., an adhesive-backed film.

BACKGROUND ART

For example, as described in Japanese Unexamined Patent Application Publication No. 2000-160115A, an adhesive-backed film may be applied to a surface of a predetermined base material. In recent years, there has been a demand to apply adhesive-backed film to surfaces of wide base materials having all kinds of shapes (for example, a film for replacing liquid paint applied to a roof of a vehicle, appliance or the like). The work to apply this type of film is commonly performed manually using a squeegee type tool (may be described below simply as a squeegee) that mounts a rubber blade on the tip end.

SUMMARY OF THE INVENTION

When performing the work to apply a film (e.g., an adhesive-backed film) on a surface of a base material using a squeegee, it is necessary to press the film against the surface of the base material with the squeegee. However, in such work of pressing, or a process of applying, the film to the base material, there is a concern that a shock line will be generated in the film, which would be aesthetically undesirable. Here, in the present specification, the shock line refers to a defect in appearance such as an adhesion crease generated at a boundary between a pressed portion and a non-pressed portion of the film, when the squeegee is stopped in the process of applying the film to the base material or, if the squeegee is narrower than the film, an adhesion crease generated at a boundary between an end portion in a width direction of the squeegee and the film. The possibility of such a shock line being generated exists over the entire process of film application, including at a pressing start location and a pressing end location; in particular, when applying a film of a high gloss, a crease thereof standing out excessively has been regarded as a problem. Due to the above, there have been demands to improve an application quality of the film.

An application method according to one form of the present invention is an application method of applying a film to a base material using an application device having a pressing unit, the film having a main portion, a first extended portion connected to a first end of the main portion, and a second extended portion connected to a second end opposing the first end in the main portion, the method including the steps of: pressing the first extended portion with the pressing unit, applying the main portion to the base material by moving the pressing unit that presses the first extended portion from the first extended portion to the second extended portion via the main portion, and stopping the pressing unit moved to the second extended portion and separating the pressing unit from the second extended portion.

In the present application method, pressing of the film by the pressing unit starts from the first extended portion. In other words, the first extended portion is a starting point of film pressing by the pressing unit. Further, the pressing unit that moves from the first extended portion to the second extended portion via the main portion is stopped at the second extended portion. In other words, the second extended portion is an ending point of film pressing by the pressing unit. When applying the film to the base material by pressing the film with a tool or the like, a shock line is more likely to be generated at the starting point and the ending point of this pressing. Since the first extended portion is the starting point of pressing and the second extended portion is the ending point of pressing, the present application method is easily made to be of an aspect in which a shock line is not generated in a portion of the film that will be made into a product by, for example, applying the main portion to the base material (portion that will be made into the product), applying (or pressing) the first extended portion and the second extended portion to other portions, and the like. From the above, according to the present invention, an application quality of the film can be improved.

In an application method according to another form, the base material may be a body portion (e.g., a roof or ceiling portion) of a vehicle.

In an application method according to another form, the first extended portion and the second extended portion may be continuously connected to the main portion.

In an application method according to another form, the film may have a film main body that can be applied to the base material, and in the film main body, in a boundary region between the first and second extended portions and the main portion, a separation portion extending in a direction intersecting a direction in which the pressing unit moves in a surface direction of the film may be formed.

In an application method according to another form, the base material may extend in a horizontal direction, and in the applying step, the main portion may be applied to the base material in the horizontal direction by the pressing unit moving in the horizontal direction.

A film according to one form of the present invention is a film applied to a base material by an application device having a pressing unit, including: a main portion pressed against the base material by receiving a pressing force from the pressing unit; a first extended portion that is connected to a first end of the main portion and receives the pressing force from the pressing unit prior to the main portion; and a second extended portion that is connected to second end opposing the first end in the main portion and receives the pressing force from the pressing unit after the main portion.

In a film according to another form, the first extended portion and the second extended portion may be continuously connected to the main portion.

In a film according to another form, a film main body able to be applied to the base material may be further provided, wherein in the film main body, in a boundary region between the first and second extended portions and the main portion, a separation portion extending in a direction intersecting a direction in which the pressing unit moves in a surface direction of the film may be formed.

A film according to one form of the present invention is a film applied to a ceiling portion of a vehicle by an application device having a pressing unit, the film including: a main portion that receives a pressing force from the pressing unit and is pressed against the ceiling portion; a first extended portion that is connected to first end of the main portion and receives the pressing force from the pressing unit; and a second extended portion that is connected to second end opposing the first end in the main portion and receives the pressing force from the pressing unit.

A film according to the present invention can be an adhesive-backed film (e.g., polymeric film). Such films can be transparent and used to protect a surface (e.g., a painted or otherwise colored or decorative surface). Such films can also be colored (e.g., by pigmentation) and used to color a surface that would otherwise be colored with conventional liquid paint.

According to one aspect of the present invention, the application quality of the film can be improved.

BRIEF DESCRIPTION OF THE DRAWINGS

FIG. 4b is a cross-sectional view at line b-b in FIG. 4a.

FIG. 7b is a cross-sectional view at line b-b in FIG. 7a, and FIG. 7c is a cross-sectional view at line c-c in FIG. 7a.

MODES FOR CARRYING OUT THE INVENTION

Embodiments of the present invention will now be described in detail with reference to the attached drawings. Note that in the descriptions of the drawings, similar or identical components are assigned identical reference numbers and duplicate descriptions thereof are omitted.

First Exemplary Embodiment

Figure 1:
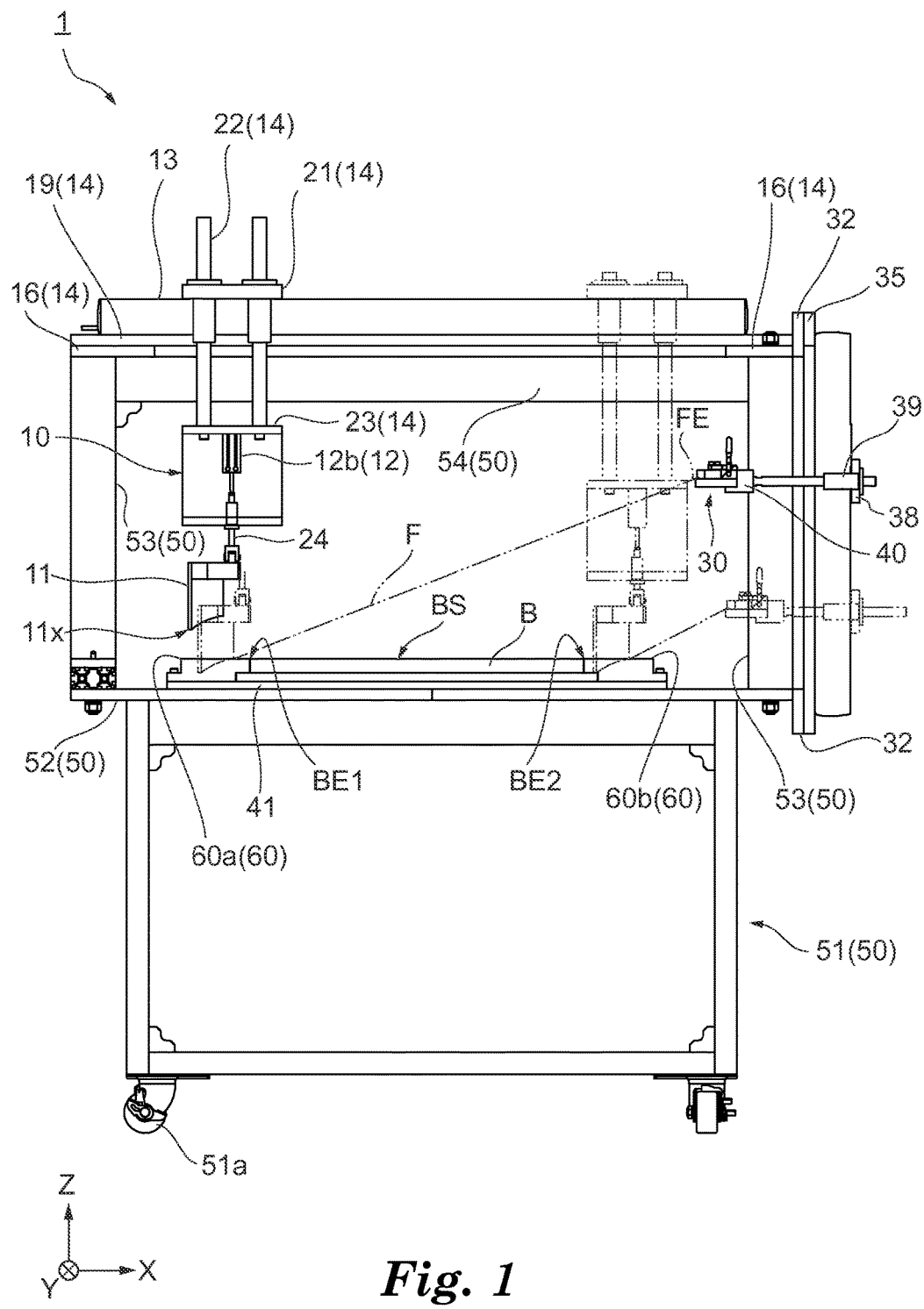
FIG. 1 is a front view of an application device relating to an application of a film of a first embodiment.
Figure 2:
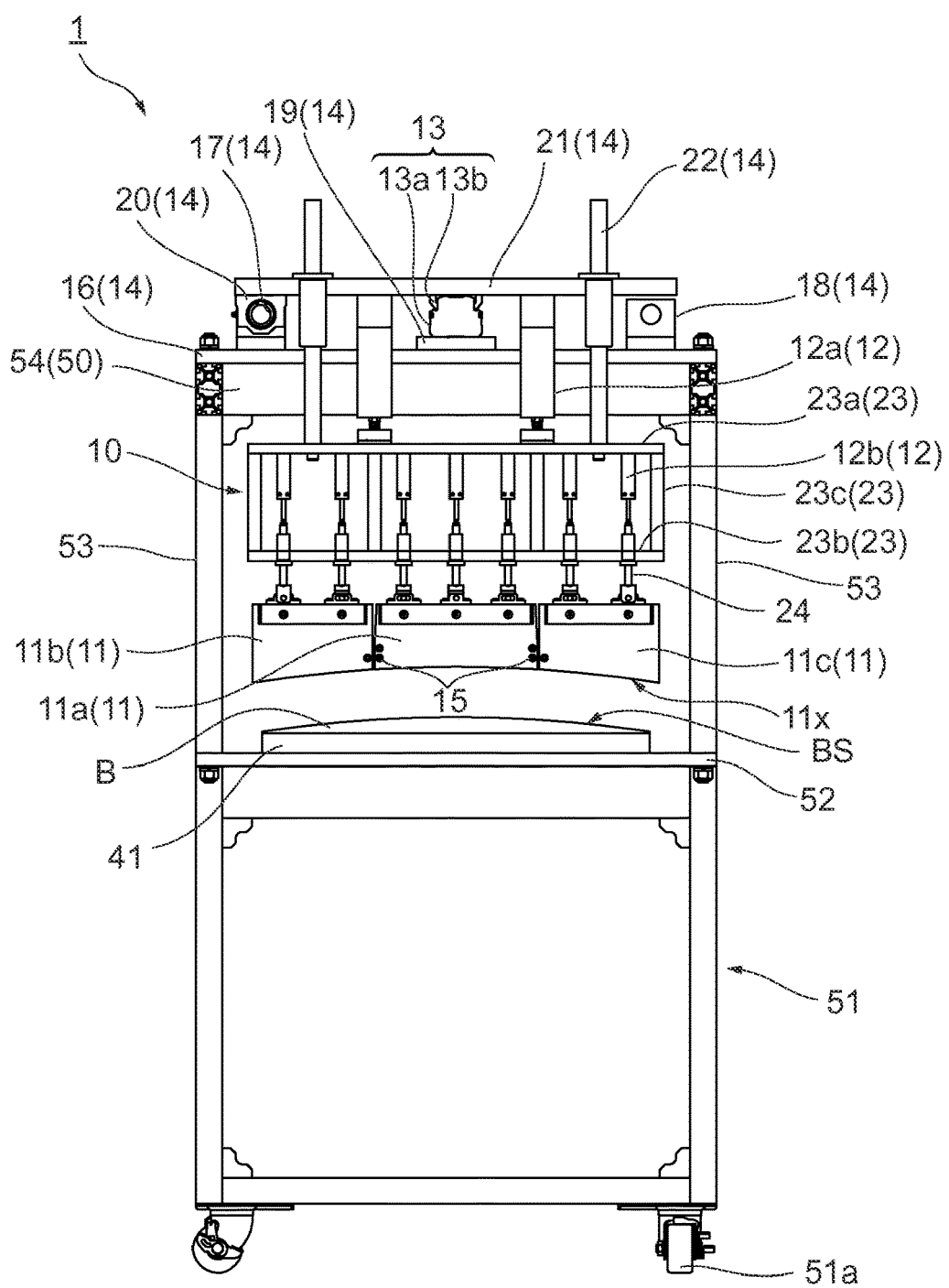
FIG. 2 is a side view of the application device relating to the application of the film of the first embodiment.
Figure 3A:
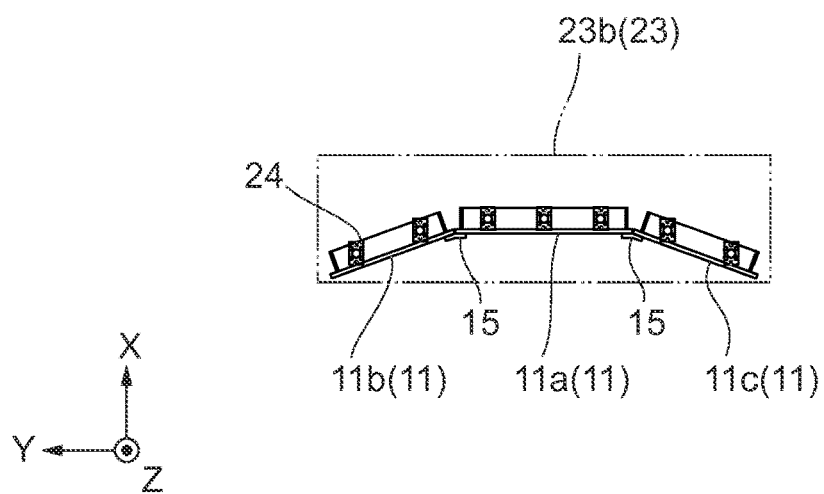
FIGS. 3a and 3b are plan views of the application device relating to the application of the film of the first embodiment.
Figure 3B:
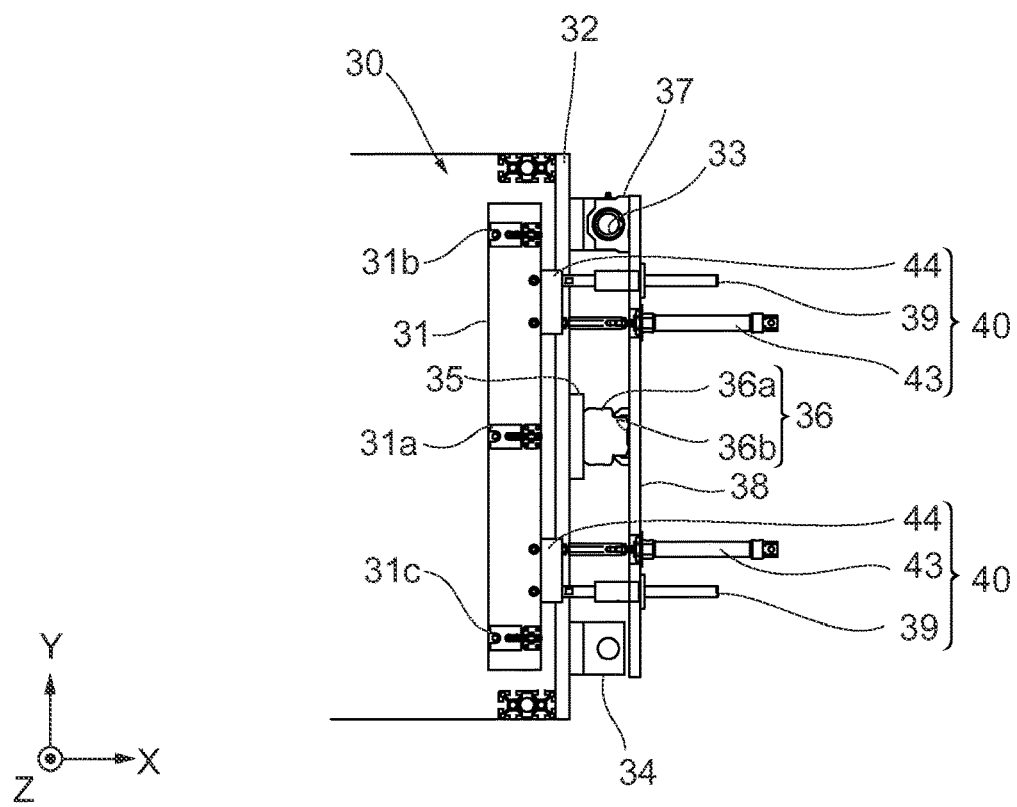

A configuration of an application device 1 relating to a film and an application method of the film of the first embodiment will be described with reference to FIGS. 1 to 3. The application device 1 is an application device that applies a film F onto a base material B having a bonding surface BS. The base material B having the bonding surface BS is not particularly limited as long as it is a base material having a surface to which the film F is applied. The base material B utilized in this embodiment has the bonding surface BS that is curved so as to be convex upward and has a horizontal cross-sectional shape that is constant in the length direction. The film F is not particularly limited as long as it has a thin film shape and is molded in a thin film shape having a polymer component such as a synthetic resin and the like. Details of the film F will be described below.

First, a frame structure 50 of the application device 1 will be described. As illustrated in FIG. 1 to FIG. 3, an application device 1 includes, as the frame structure 50, a base portion 51, a rectangular flat portion 52 provided substantially level on an upper end of the base portion 51, four column portions 53 that extend upward from the four corners of the flat portion 52, and four beam portions 54 spanning between upper ends of adjacent column portions 53. Each configuration of the frame structure 50 is configured of, for example, an aluminum frame. The base portion 51 is configured to be movable by casters 51a. A rectangular table 41 is provided on the flat portion 52 to place the base material B. The flat portion 52 and the table 41 are identical in the long direction and the short direction. Hereinafter, the following description may refer to the long direction as an X-axis direction and the short direction as a Y-axis direction of the flat portion 52 and the table 41. Further, a direction in which the column portions 53 extend, which is orthogonal to the X-axis direction and the Y-axis direction, may be referred to as a Z-axis direction.

The application device 1 is provided with an application mechanism 10 (pressing unit) that applies the film F to the base material B by pressing the film F, a film gripping part 30 that grips the film F, and a tension adjuster 40 that can adjust the tension of the film F. The application mechanism 10 and the film gripping part 30 are integrated into the frame structure 50 described above. Note that, in FIG. 1, a portion of the members disposed on the paper surface front side (such as a shaft 17 and the like described below) are omitted for clarification and illustrating details of the application mechanism 10 and the film gripping part 30.

The application mechanism 10 has an application unit 11 that presses the film F to apply the film F on the base material B from a first end BE1 in a first direction to a second direction BE2. The first direction is an extending direction of the base material B when the base material B is placed on the table 41 (i.e. a horizontal direction) and is the X-axis direction described above. The following description presupposes that the base material B is placed on the table 41. Moreover, each direction in the description of the film F is described assuming a state where the film F is applied to the base material B.

The application mechanism 10 includes the application unit 11 described above, a positioning mechanism 12 that determines the pressing position of the film F by the application unit 11 in the second direction, a drive mechanism 13 that drives the application unit 11 in the X-axis direction, and a support mechanism 14 that supports the application unit 11. The second direction is a direction that is orthogonal to the X-axis direction and in which the bonding surface BS and the film F are opposed to each other, and is the Z-axis direction described above. The application mechanism 10 presses the film F by moving relatively in the X-axis direction and the Z-axis direction on the base material B. Specifically, the positioning mechanism 12 drives the application unit 11 in the Z-axis direction while the drive mechanism 13 drives the application unit 11 in the X-axis direction, and thereby, the film F is pressed on the base material B by the application unit 11.

The application unit 11 presses the film F to apply the film F to the bonding surface BS of the base material B. The pressing of the film F refers to the application unit 11 pressing the film F onto the bonding surface BS while the film F is sandwiched between the application unit 11 and the bonding surface BS. The application unit 11 is supported above the film F and the base material B by the support mechanism 14 (details to be described below), and presses the film F from above the film F and the base material B. The application unit 11 has a tip end 11X formed in a squeegee shape and presses the film F by the tip end 11X. For example, a rubber blade (not illustrated) is provided as a cushioning material to the tip end 11X. The shape of the tip end 11X of the application unit 11 is not limited to a squeegee type, but may also be, for example, a roller type. A length in a width direction of the application unit 11 is longer than the length in the width direction of the base material B.

The application unit 11 is split into a plurality of split sections 11a, 11b, and 11c along the Y-axis direction. With the application unit 11, the split sections 11b and 11c are disposed on both sides of the split section 11a, and the split section 11a and the split section 11b, and the split section 11a and the split section 11c are coupled by couplers 15, respectively. In this embodiment, the base material B (bonding surface BS) is in a curved shape so as to be convex on the Z-axis direction positive side (upward) approaching the center portion of the base material B in the Y-axis direction when viewed from the X-axis direction. With the application unit 11, the tip end 11X is shaped according to the curved shape of the base material B (bonding surface BS). In other words, the application unit 11 is formed into a concave shape on the Z-axis direction positive side approaching the center portion of the tip end 11X in the Y-axis direction when viewed from the X-axis direction. Further, the application unit 11 is formed in a curved shape so as to be convex from a first end BE1 to a second end BE2 of the base material B when viewed from the Z-axis direction. The coupler 15 is a movable coupler, and is a coupler that pivots according to positions of the split sections 11a, 11b, and 11c and the guide shaft 24.

Further, the coupler 15 may function so as to adjust the relative positions of the split sections 11a, 11b, and 11c so that excessive gaps do not occur between the split sections 11a, 11b, and 11c. For example, when the bonding surface BS of the base material B is greatly curved, creating a large amount of protrusion in the center portion in the Y-axis direction, the split sections 11b and 11c are squeezed inward and the split sections 11b and 11c are coupled to the split section 11a by the coupler 15. The split sections 11a, 11b, and 11c can each be driven in the Z-axis direction independently by the driving force of the drive unit 12b. Note that by adding the drive unit, each of the split sections 11a, 11b, and 11c may be driven in the X-axis direction, independently. By this, the curved shape of the application unit 11 can be adjusted to match the base material B when viewed from the Z-axis direction. At this time, the mutual coupling angles of the couplers 15 for the split sections 11a, 11b, and 11c when viewed from the Z-axis direction can be changed. Note that the coupler 15 may not necessarily be provided. In other words, the split sections 11a, 11b, and 11c may not be mutually coupled.

The support mechanism 14 is a mechanism for supporting the application unit 11 from above the base material B. Further, support mechanism 14 functions as a guide mechanism to guide the drive in the X-axis direction of the application unit 11. The support mechanism includes: a pair of attachment plates 16 provided so as to span between the pair of beam portions 54 on both ends of the pair of beam portions 54 that extend in the X-axis direction; a pair of shafts 17 that extend in the X-axis direction provided so as to span between the pair of attachment plates 16 (note that, in FIG. 2, only the shaft 17 on the Y-axis direction positive side (Y-axis direction first end side) is illustrated of the pair of shafts 17); a shaft holder 18 to secure both ends of each of the pair of shafts 17 to the attachment plates 16 (note that, in FIG. 2, only the shaft holder 18 on the Y-axis direction negative side (Y-axis direction second end side) is illustrated of the shaft holders 18); a drive mechanism attachment plate 19 fixed to the pair of attachment plates 16 and extending in the X-axis direction between the pair of shafts 17; a pair of linear bearings (linear bushings) 20 provided respectively for the pair of shafts 17; a slide plate 21 fixed to a slider 13b (details described below) provided on the drive mechanism attachment plate 19 and the upper surface of the pair of linear bearings 20; a guide shaft 22 fixed to the slider plate 21 so as to pass through the slider plate 21 in the Z-axis direction; and a support box 23 fixed to the bottom end of the guide shaft 22.

The box 23 is configured to include an upper wall 23a and a lower wall 23b provided substantially horizontal and opposing in the Z-axis direction, and a coupling wall 23c provided substantially vertical to connect the upper wall 23a and the lower wall 23b. A drive unit 12a (details described below) of the positioning mechanism 12 that gives a thrust on the Z-axis direction negative side (downward) is fixed to the upper surface of the upper wall 23a. The guide shaft 22 can expand and contract in the Z-axis direction in conjunction with the drive unit 12a driving the upper wall 23a on the Z-axis direction negative side. Further, a drive unit 12b (details described below) that gives a thrust on the Z-axis direction negative side is fixed to the bottom surface of the upper wall 23a, the guide shaft 24 is fixed to the bottom end of the drive unit 12b, and the application unit 11 is fixed to the bottom end of the guide shaft 24. The shaft 17 is, for example, a cylindrical shaft shaped member made of aluminum. The linear bearing 20 is a guide member used in combination with the shaft 17 for linear movement in the X-axis direction with little friction resistance about the shaft 17 in conjunction with the drive of the slider 13b. The linear bearing 20 guides the drive in the X-axis direction of the slide plate 21 fixed to the slider 13b.

The positioning mechanism 12 determines the pressing position in the Z-axis direction of the film F by the application unit 11. The positioning mechanism 12 is configured of the drive units 12a and 12b. Air cylinders are employed as the drive units 12a and 12b, and the air cylinders drive the application unit 11 on the Z-axis direction negative side using pneumatic pressure. The pneumatic pressure applied to the drive units 12a and 12b is predetermined according to the shape of the base material B. The upper end of the drive unit 12a is fixed to the slide plate 21 while the lower end is fixed to the upper surface of the upper wall 23a. The drive unit 12a drives the box 23 on the Z-axis direction negative side by the pneumatic pressure to drive the application unit 11 on the Z-axis direction negative side via the drive unit 12b and the guide shaft 24. In other words, the drive unit 12a determines the pressing position generally in the Z-axis direction of the application unit 11 by driving the box 23 on the Z-axis direction negative side. Two drive units 12a are provided, for example, in line in the Y-axis direction.

The drive unit 12b drives the guide shaft 24 on the Z-axis direction negative side by the pneumatic pressure to drive the application unit 11 on the Z-axis direction negative side fixed to the bottom end of the guide shaft 24. Seven drive units 12b are provided, for example, in line in the Y-axis direction. Three of the drive units 12b (the central drive unit 12b) positioned in the center of the Y-axis direction are fixed to the split section 11a of the application unit 11 via the guide shaft 24. Further, the two drive units 12b positioned closer to the Y-axis direction positive side than the central drive unit 12b are secured to the split section 11b via the guide shaft 24, and the two drive units 12b positioned closer to the Y-axis direction negative side are secured to the split section 11c via the guide shaft 24. Therefore, although the drive unit 12b can drive each of the split sections 11a, 11b, and 11c independently on the Z axis direction negative side, each of the drive units 12b may drive the split sections 11a, 11b, and 11c on the Z axis direction negative side each with the same force. When the drive unit 12b drives each of the split sections 11a, 11b, and 11c independently on the Z-axis direction negative side, the couplers 15 may not be provided, and actuators may be internally installed in the couplers 15 themselves so as not to interfere in the independent operations of the split sections 11a, 11b, and 11c. After the general pressing position in the Z-axis direction of the application unit 11 is determined by the drive unit 12a, the drive unit 12b determines the specific pressing position in the Z-axis direction of the application unit 11 by driving each of the split sections 11a, 11b, and 11c on the Z-axis direction negative side. The position in the Z-axis direction of the application unit 11 after positioning by the drive unit 12b is a position in which the film F can be pressed onto the bonding surface BS of the base material B.

The drive mechanism 13 drives the application unit 11 in the X-axis direction supported by the support mechanism 14 by driving the slide plate 21, which is the support mechanism 14, in the X-axis direction. The drive mechanism 13 is configured by a drive mechanism that employs, for example, a single axis robot. Hereinafter, the drive mechanism 13 is described as a single axis robot. The drive mechanism 13 includes a base portion 13a extending in the X-axis direction and fixed to the drive mechanism attachment plate 19 and a slider 13b that is driven within the base portion 13a in the X-axis direction by a motor. The slider 13b fixes the slide plate 21 on the top surface thereof. The drive mechanism 13 is controlled by a dedicated controller (not illustrated). The drive speed and the drive distance of the slider 13, for example, when driving the slider 13b, is preset in the controller. Note that the movement speed (drive speed) preset in the controller is variable for when the application unit 11 is pressing the film F.

Here, an extension part 60 may be provided to a table 41 in addition to the base material B. The extension part 60 has a first extension part 60a provided so as to be continuous with the first end BE1 of the base material B in the X-axis direction and a second extension part 60b provided so as to be continuous with the second end BE2 of the base material B. The upper surfaces of the first extension part 60a and the second extension part 60b are flush with the bonding surface BS of the base material B. The drive mechanism 13, when driving the application unit 11 in the X-axis direction, makes the starting point of the drive to be where the first extension part 60a is provided and the ending point of the drive to be where the second extension part 60b is provided. Note that, although not illustrated in FIGS. 1 to 3, the end portion of the film F on the opposite side to the side gripped by the film gripping part 30 is gripped in a position where the position in the Z-axis direction is substantially matching with the bonding surface BS of the base material B on the X-axis direction negative side (opposite side to the side where the base material B is provided in the X-axis direction) more so than the first extension part 60a (details will be described below).

The film gripping part 30 grips the end portion FE of the film F of the second end BE2 side in the X-axis direction and is driven in the Z-axis direction. The film gripping part 30 includes: a gripping plate 31 that extends in the Y-axis direction on which gripping members 31a, 31b, and 31c are provided that grip the end portion FE; a pair of attachment plates 32 that span between the upper ends and lower ends of the adjacent column portions 53 on the second end BE2 side in the X-axis direction; a pair of shafts 33 extending in the Z-axis direction provided so as to span between the pair of attachment plates 32 (in FIG. 3b, only the shaft 33 on the Y-axis direction positive side is illustrated); a shaft holder 34 that fixes both ends of each of the pair of shafts 33 is fixed to the attachment plate 32 (in FIG. 3b, only the shaft holder 34 on the Y-axis direction negative side is illustrated); a drive mechanism attachment plate 35 fixed to the pair of attachment plates 32 and extending in the Z-axis direction between the pair of shafts 33; a drive mechanism 36 extending in the Z-axis direction fixed to the drive mechanism attachment plate 35; a pair of linear bearings (linear bushings) 37 provided respectively for the pair of shafts 33; and a slide plate 38 fixed to a slider 36b of the drive mechanism 36 and the pair of linear bearings 37. The gripping member 31a is provided in a center portion of the Y-axis direction on the gripping plate 31, and the gripping members 31b and 31c are provided at both ends in the Y-axis direction of the gripping plate 31. The gripping members 31a, 31b, and 31c each have a projecting portion 31x that projects from the gripping plate 31 on the Z-axis direction positive side. By a hole portion (details will be described below) of the film F being fitted to the projecting portion 31x, the film F is fixed to the film gripping part 30.

The drive mechanism 36, similar to the drive mechanism 13 described above, is configured by a drive mechanism that employs, for example, a single axis robot. The drive mechanism 36 includes a base portion 36a extending in the Z-axis direction and fixed to the drive mechanism attachment plate 35 and a slider 36b that is driven by a motor within the base portion 36a in the Z-axis direction. The slider 36b is fixed to the gripping plate 31 via the slide plate 38, the guide shaft 39, and a coupling plate 44. Therefore, the gripping plate 31 is driven in the Z-axis direction in conjunction with the drive in the Z-axis direction of the slider 36b. The drive mechanism 36 is controlled by a dedicated controller (not illustrated). The drive speed and the drive distance of the slider 36, for example, when driving the slider 36b, is preset in the controller. The drive speed and the drive distance in the Z-axis direction of the slider 36b is determined according to the drive speed and the drive distance in the X-axis direction of the slider 13b set in the controller of the drive mechanism 13. In this embodiment, the angle formed by the X-axis direction (extending direction of the bonding surface BS) and the film F prior to pressing is always a substantially constant angle while pressing the film F by the application unit 11. Therefore, the drive speed and the drive distance of the slider 36b must be a value that corresponds to the drive speed and the drive distance of the slider 13b. The drive speed and the drive distance of the sliders 13b and 36b may be set to values pre-associated in the controllers of the drive mechanism 13 and 36. Further, both of the drive speeds and the drive distances may be adjusted by, for example, sending and receiving information signals between the controllers of the drive mechanisms 13 and 36 concerning real time position, speed, pressing force on the film, and the like, during pressing by the application unit 11.

A tension adjuster 40 is mounted on the film gripping part 30. Specifically, the tension adjuster 40 is provided with a drive unit 43 that drives the gripping members 31a, 31b, and 31c in the X-axis direction, a guide shaft 39 fixed to the slide plate 38 and that passes through the slide plate 38 in the X-axis direction, and a coupling plate 44 that connects the gripping plate 31 and the guide shaft 39. For example, an air cylinder may be employed as the drive unit 43, and the tension may be adjusted by controlling the pneumatic pressure. The tension adjuster 40 may drive the gripping members 31a, 31b, and 31c in the X-axis direction via the gripping plate 31. Note that, the tension adjuster may have a configuration in which a roll shaped rolling device is provided to adjust the payout length of the film instead of using a drive unit such as an air cylinder.

Figure 4A:
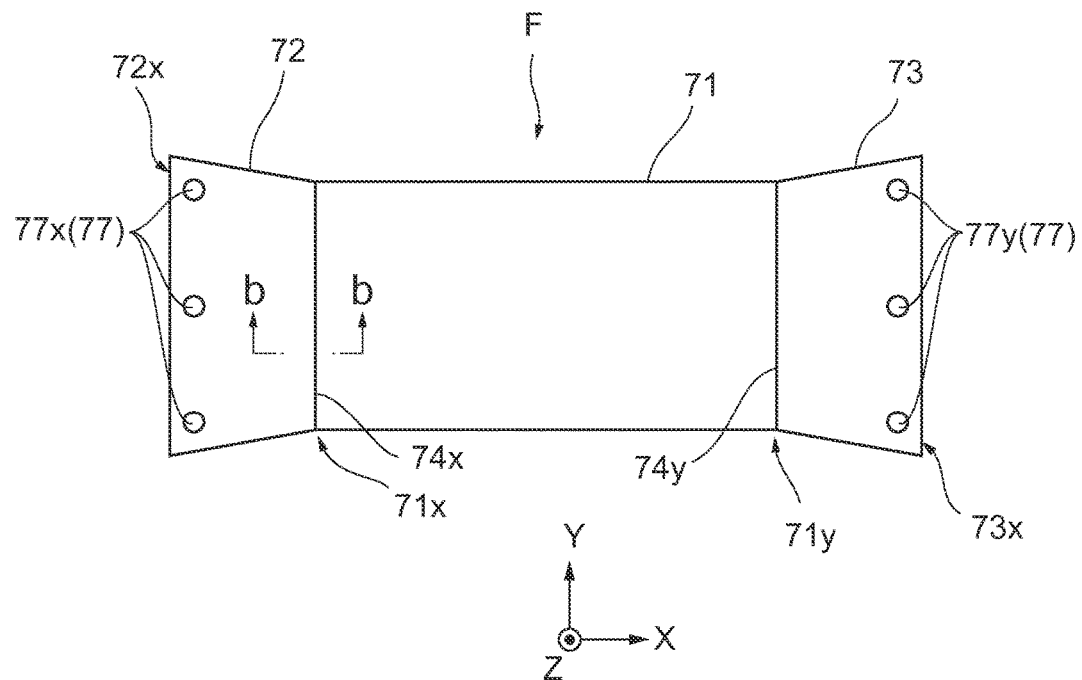
FIG. 4a is a plan view of the film of the first embodiment.

Next, the details of the film F will be described with reference to FIGS. 1 to 3 as well as FIGS. 4 and 5. The film F, as described above, is a film applied to the base material B by the application device 1 having the application mechanism 10. As illustrated in FIG. 4a, the film F is provided with: a main portion 71 of a rectangular shape, an extended portion 72 (first extended portion) continuously connected to first end 71x in a longitudinal direction of the main portion 71 (end portion on the X-axis direction negative side in the main portion 71), and an extended portion 73 (second extended portion) continuously connected to second end 71y in the longitudinal direction of the main portion 71 (end portion on the X-axis direction positive side in the main portion 71). The extended portion 72 is formed in a trapezoidal shape. The extended portion 72 is formed so that the length in the Y-axis direction thereof is longer heading from a connection location with the first end 71x toward an end portion 72x on an opposite side of the connection location in the X-axis direction. Similarly, the extended portion 73 is also formed in a trapezoidal shape. The extended portion 73 is formed so that the length in the Y-axis direction thereof is longer heading from a connection location with the second end 71y toward an end portion 73x on an opposite side of the connection location in the X-axis direction. However, shapes of the extended portions 72, 73 are not limited in particular; they do not have to be trapezoidal shapes such as those that widen heading toward the end portions 72x, 73x as described above. For example, the extended portions 72, 73 may be rectangular shapes or may be trapezoidal shapes that become narrower toward the end portions 72x, 73x.

The main portion 71 is pressed against the base material B by receiving a pressing force from the application unit 11 of the application mechanism 10. Here, the extended portions 72, 73 are similar to the main portion 71 in that they receive the pressing force from the application unit 11 but differ from the main portion 71 in that they are pressed against the extension part 60 and not the base material B. The extended portion 72 receives the pressing force from the application unit 11 prior to the main portion 71 and is pressed against a first extension part 60a. Further, the extended portion 73 receives the pressing force from the application unit 11 after the main portion 71 and is pressed against a second extension part 60b. Note that the extended portions 72, 73 do not necessarily need to be pressed against the extension part 60. For example, the base material B may be larger than the main portion 71 of the film F, and a portion of the base material B may exhibit a function as an extension part. Alternatively, pressing adjustment may be performed on a mechanism side of the application device 1. For example, by moving portions corresponding to the extended portions 72, 73 from among the film F while slightly abutting the application unit 11, the extended portions 72, 73 are made to be in a state of not being pressed against the extension part 60, and the application unit 11 may be pressed against the base material B at a portion corresponding to the main portion 71. Note that when moving the portions corresponding to the extended portions 72, 73 from among the film F while slightly abutting the application unit 11, a pressure of the application unit 11 acting on the film F may be made to be substantially constant with a pressure acting on the main portion 71 by controlling the tension adjuster 40 to slightly lift the film F.

Hole portions 77 fitted to the projecting portion 31x are formed near both ends in the X-axis direction of the film F. In other words, a hole portion 77y fitted to the projecting portion 31x of the gripping plate 31 is formed near the end portion 73x of the extended portion 73. Further, a hole portion 77x fitted to the projecting portion 31x of a gripping member 91 (see FIG. 5) is formed in the end portion 72x of the extended portion 72. Note that the gripping member 91 (see FIG. 5) grips an end portion on an opposite side of a side gripped by the film gripping part 30 in the film F (in other words, the end portion 72x of the extended portion 72). In a state where the work of applying the film F is being performed, a position in a Z-axis direction of the gripping member 91 is secured. By the projecting portion 31x and the hole portion 77 being fitted to each other, the film F can be firmly gripped by the gripping plate 31 and the gripping member 91. Further, forming the hole portion 77 makes preparation of the application device easy and positioning precision high. Further, the hole portion 77 is not necessarily needed; securing may be performed by a function that grips the film F on an application device side or by an adhesive and the application device.

Figure 4B:
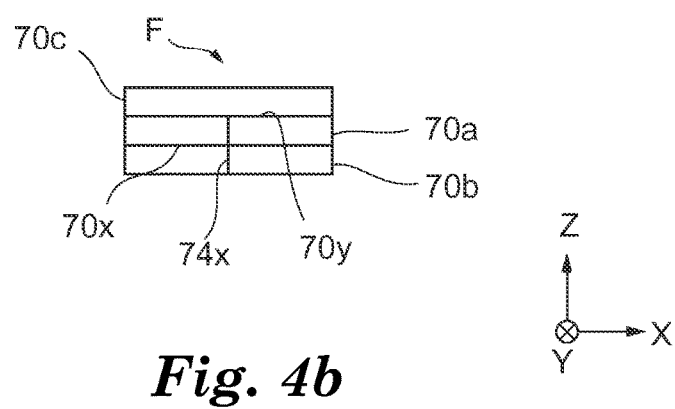
Figure 5:
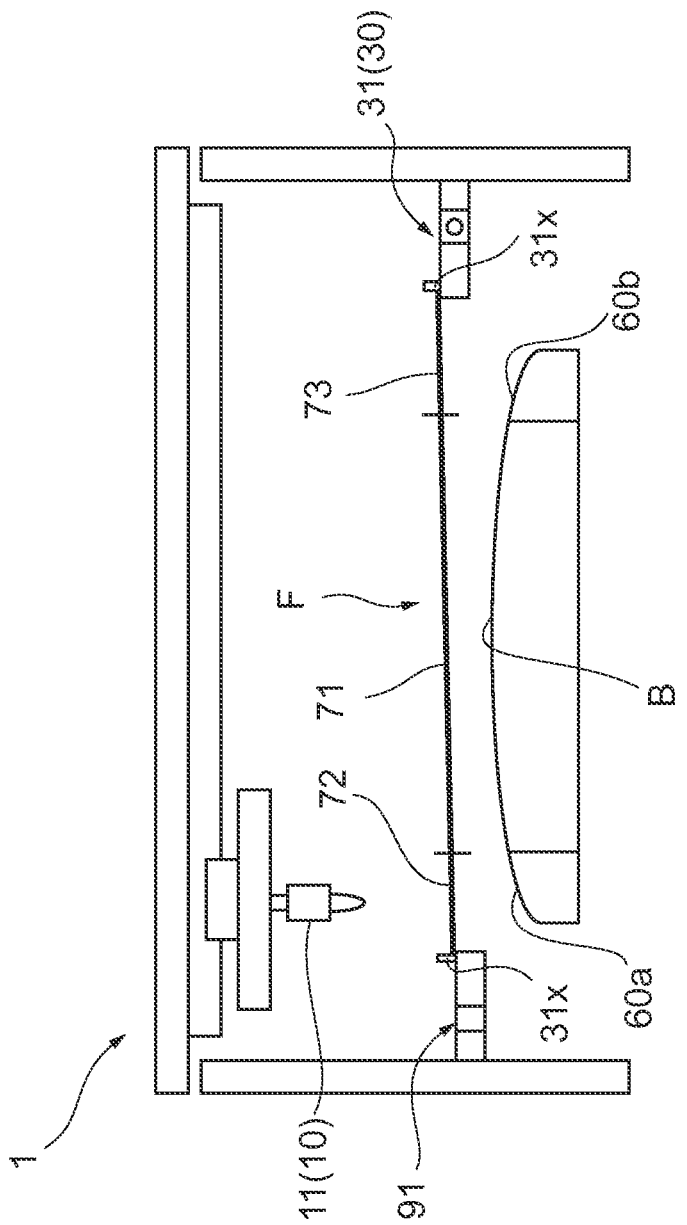
FIG. 5 is a schematic view of the application device at a step before film pressing.

The main portion 71 and the extended portions 72, 73 of the film F are, as illustrated in FIG. 4b, of a three-layer structure and are configured including a film main body 70a having an adhesive surface 70x that can be applied to the base material B (or the extension part 60; may be described below as the base material B or the like), a peeling sheet 70b disposed so as to oppose the adhesive surface 70x (lower surface) of the film main body 70a, and an application film 70c disposed so as to oppose a decorative surface 70y (upper surface) of the film main body 70a. In the present specification, the three-layer structure is described for the sake of description, but various aspects may be utilized for a number of layers. For example, a large number of layers may be stacked to increase the designability of the film main body.

The film main body 70a is formed by molding, for example, a polymer component such as a synthetic resin into a thin film shape and has the adhesive surface 70x configured by an acrylic adhesive or a urethane adhesive and the decorative surface 70y configured by polyvinyl chloride or polyurethane. The adhesive surface 70x is a portion applied to the base material B or the like. The decorative surface 70y is a portion serving as a surface of the film main body 70a applied to the base material B or the like. The peeling sheet 70b is configured by, for example, a cellulose resin or a silicone resin. The peeling sheet 70b is applied to the adhesion surface 70x of the film main body 70a and is peeled from the adhesive surface 70x immediately before applying the film main body 70a to the base material B or the like. The application film 70c is configured, for example, by an olefin-based resin or polyurethane. The application film 70c protects the film main body 70a until immediately before film application, is applied to the decorative surface 70y of the film main body 70a, and is separated from the decorative surface 70y after the film main body 70a is applied to the base material B or the like.

Here, the extended portion 72 is continuously connected to the main portion 71 at the first end 71x that is a boundary region between the extended portion 72 and the main portion 71. Further, the extended portion 73 is continuously connected to the main portion 71 at the second end 71y that is a boundary region between the extended portion 73 and the main portion 71. Specifically, as illustrated in FIGS. 4a and 4b, a slit portion 74x (separation portion) of a slit shape extending in the Y-axis direction (direction intersecting the X-axis direction, which is a direction in which the application mechanism 10 moves in a surface direction of the film F) is formed at the first end 71x that is the boundary region between the extended portion 72 and the main portion 71. Further, a slit portion 74y (separation portion) of a slit shape extending in the Y-axis direction is formed at the second end 71y that is the boundary region between the extended portion 73 and the main portion 71. The slit portions 74x, 74y are formed only in the film main body 70a and the peeling sheet 70b described above and are not formed in the application film 70c. In other words, the main portion 71 and the extended portion 72 are connected by the application film 70c in a separable state at the portion of the slit portion 74x in the film main body 70a and the peeling sheet 70b. Further, the main portion 71 and the extended portion 73 are connected by the application film 70c in a separable state at the portion of the slit portion 74y in the film main body 70a and the peeling sheet 70b.

Note that the boundary regions between the main portion 71 and the extended portions 72, 73 refer to boundaries between the main portion 71 and the extended portions 72, 73 (the first end 71x or the second end 71y in this embodiment) and regions nearby. The separation portion (here, the slit portions 74x, 74y) may be formed above the boundary or may be formed closer to a main portion 71 side or extended portion 72, 73 sides than the boundary.

Here, a slit width (width in an X-axis direction of the slit) of the slit portions 74x, 74y is made to be narrow to an extent where at least the film main body 70a of the main portion 71 and the film main body 70a of the extended portions 72, 73 can be deemed to be continuous in the slit portions 74x, 74y. Being narrow to the extent of being continuous refers to being narrow to an extent where a shock line is not generated by an influence of the slits when the first end 71x and the second end 71y are pressed by the application unit 11. Specifically, the slit width is made to be narrow to an extent where the application unit 11 can directly pass through although either the end surfaces of the film main body 70a of the main portion 71 and the film main body 70a of the extended portions 72, 73 contact each other or do not contact each other (for example, 5 mm or less). From the above, the state where the extended portions 72, 73 are continuously connected to the main portion 71 is a state where the extended portions 72, 73 and the main portion 71 are continuous (regardless of being cut by the slit portions 74x, 74y as in this embodiment) at least in the film main body 70a and connected at any one of the layers (the application film 70c in this embodiment).

Figure 6A:
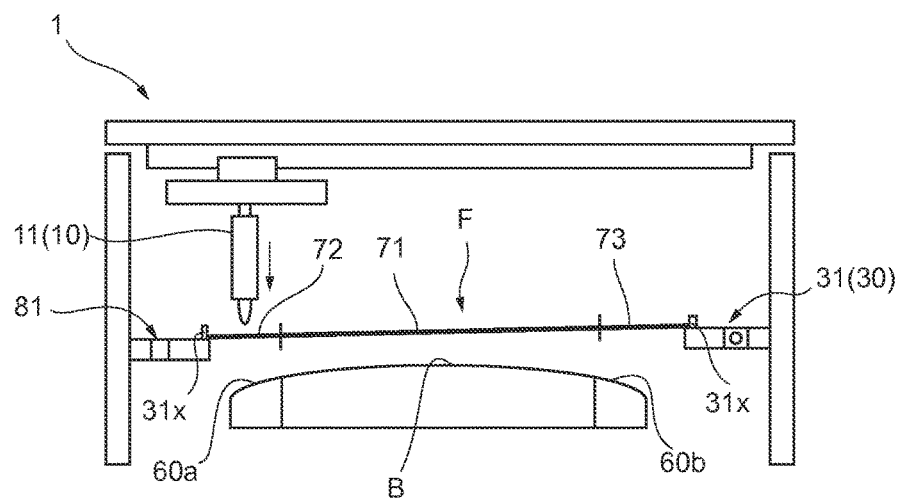
FIGS. 6a to 6c are schematic views of an application process of the film by the application device.

Next, an application method of the film F using the application device 1 according to this embodiment will be described with reference to FIGS. 1 to 5 as well as FIG. 6. As preliminary preparation for operating the application device 1, the base material B, the first extension part 60a, and the second extension part 60b are set on a table 41. Further, the hole portions 77 formed near both ends of the film F and the projecting portions 31x of the gripping plate 31 and the gripping member 91 are fitted to each other, and the film F is gripped by the gripping plate 31 and the gripping member 91. Note that in the state where the film F is gripped by the gripping plate 31 and the gripping member 91, the main portion 71 is disposed on the Z-axis direction positive side of the base material B, the extended portion 72 is disposed on the Z-axis direction positive side of the first extension part 60a, and the extended portion 73 is disposed on the Z-axis direction positive side of the second extension part 60b. Then, a position in the X-axis direction of the application mechanism 10 is adjusted so that the application unit 11 is disposed on the Z-axis direction positive side of the first extension part 60a and the extended portion 72 (FIG. 6a). Finally, the peeling sheet 70b is peeled from the adhesive surface 70x in a section from the slit portion 74x to the slit portion 74y. In this state, the extended portions 72, 73 are made to be of the three-layer structure of the film main body 70a, the peeling sheet 70b, and the application film 70c, and the main portion 71 is made to be of the two-layer structure of the film main body 70a and the application film 70c. However, the peeling sheet 70b of the extended portions 72, 73 may be peeled.

Figure 6B:
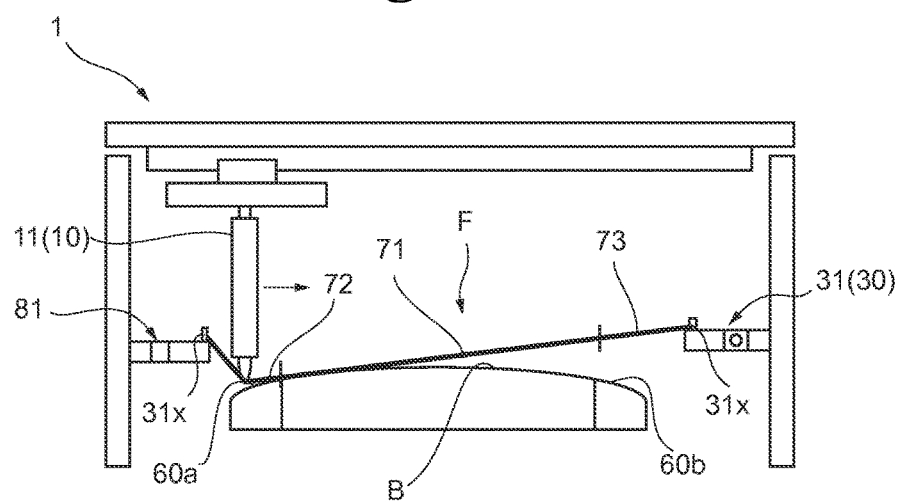

Once preliminary preparation is complete, first, an operator's instruction (for example, pressing a start button or the like to initiate drive in the Z-axis direction) triggers the drive unit 12a to drive the application unit 11 on the Z-axis direction negative side by pneumatic pressure. By this, a general pressing position is determined in the Z-axis direction of the application unit 11. Subsequently, the drive unit 12b drives the application unit 11 on the Z-axis direction negative side by the pneumatic pressure. By this, the specific pressing position is determined in the Z-axis direction of the application unit 11. The position in the Z-axis direction of the application unit 11 after positioning by the drive unit 12b is a position in which the application unit 11 can press the film F onto the base material B. Here, in the preliminary preparation described above, a position in the X-axis direction of the application mechanism 10 is adjusted so that the application unit 11 is disposed on the Z-axis direction positive side of the first extension part 60a and the extended portion 72. Because of this, when pressing is started, the extended portion 72 is pressed by the application unit 11 and the extended portion 72 is pressed against the first extension part 60a (pressing process; FIG. 6b).

Figure 6C:
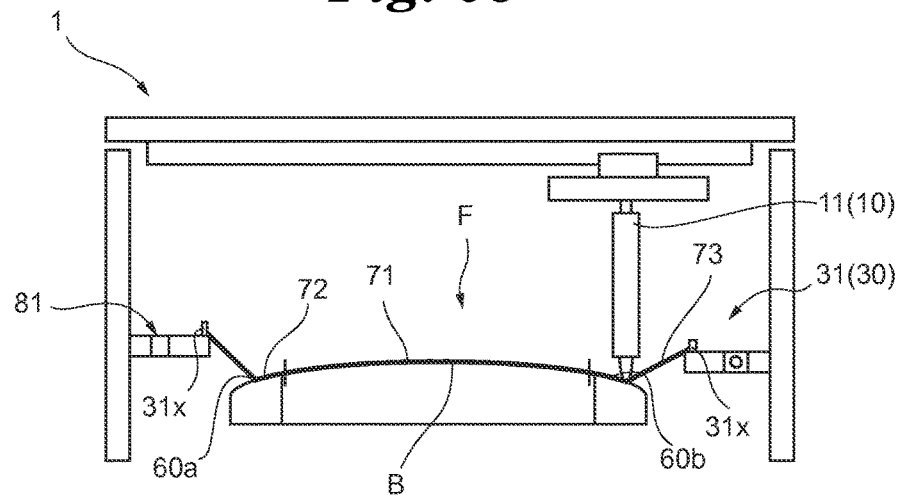

Next, the operator's instruction (for example, pressing a start button or the like to initiate operation in the X-axis direction) triggers the slider 13b of the drive mechanism 13 to drive on the X-axis direction positive side (in a direction from the first extension part 60a to the second extension part 60b). By this, the application unit 11, which presses the extended portion 72 in the pressing process described above, moves in a horizontal direction (on the X-axis direction positive side) from the extended portion 72 to the extended portion 73 via the main portion 71. In other words, a transition occurs from a state where the extended portion 72 is pressed against the first extension part 60a by the application unit 11 to a state where the main portion 71 is pressed by the application unit 11 and the main portion 71 is pressed against the base material B as well as to a state where the extended portion 73 is pressed by the application unit 11 and the extended portion 73 is pressed against the second extension part 60b. Because the peeling sheet 70b of the main portion 71 is peeled in the preliminary preparation, the adhesive surface 70x of the main portion 71 pressed by the application unit 11 is pressed against the base material B. As a result, the main portion 71 is applied to the base material B in the horizontal direction (X-axis direction) (applying process; FIG. 6c). Note that because in the preliminary preparation, the peeling sheet 70b is peeled only from the main portion 71 and the peeling sheet 70b of the extended portions 72, 73 is not peeled, the extended portions 72, 73 are not applied to the extension part 60 even by the pressing process and the applying process. However, when the peeling sheet 70b of the extended portions 72, 73 is peeled, a portion of the extended portions 72, 73 is applied to the extension parts 60a, 60b.

At the time that the slider 13b is driven in the X-axis direction, the slider 36b of the film gripping part 30 is driven on the Z-axis direction negative side corresponding to the drive in the X-axis direction of the slider 13b. By this, the gripping members 31a, 31b, and 31c of the film gripping part 30 are driven on the Z-axis direction negative side. While the application unit 11 is pressing the film F, the drive speed and the like of the sliders 13b, 36b is adjusted so that the angle formed by the X-axis direction and the film F prior to pressing is always a substantially constant angle. In other words, either the drive speed of the sliders 13b and 36b are associated and set in advance in the controllers of the drive mechanisms 13 and 36, or signals are sent and received in real time between the controllers of the drive mechanisms 13 and 36 during pressing by the application unit 11, to adjust drive speeds and the like for both of the drive mechanisms 13 and 36. Further, while the application unit 11 is pressing the film F, tension of the film F is adjusted by the drive unit 43 of the tension adjuster 40 driving the gripping members 31a, 31b, and 31c in the X-axis direction.

When the application unit 11 moves to the extended portion 73 (FIG. 6c), the drive in the X-axis direction of the slider 13b terminates and the application unit 11 stops. After stopping, the application unit 11 is returned to a position in the Z-axis direction of prior to the pressing process being initiated by the drive units 12a, 12b and is separated from the extended portion 73 (separating process). Further, the application unit 11 is returned to a position in the X-axis direction prior to the pressing process being initiated by the slider 13b (a position where the first extension part 60a is provided).

Finally, the application film 70c of the film F is peeled and the film main body 70a of the extended portions 72, 73 is cut away from the film main body 70a of the main portion 71 at the slit portions 74x, 74y, thereby completing the work of applying the film F (in more detail) to the base material B. The above are steps according to an application method of the film F using the application device 1.

Next, the application method of the film F according to the first embodiment and actions and effects of the film F will be described.

Conventionally, work to apply a film onto a surface of a predetermined base material is commonly performed by a squeegee that mounts a rubber blade on the tip end. When performing the work to apply the film by the squeegee, there is a need to press the film against the surface of the base material with the squeegee. However, in such work of pressing, there is a concern that a shock line will be generated in the film. In particular, such a shock line is more likely to be generated at a pressing start location and a pressing end location of the film. Because of this, there have been demands to improve an application quality of the film.

In the application method performed by the application device 1 according to this embodiment, pressing of the film F by the application unit 11 of the application mechanism 10 starts from the extended portion 72 of the film F. In other words, the extended portion 72 is made to be a starting point of film F pressing by the application unit 11. Further, the application unit 11 moved from the extended portion 72 to the extended portion 73 via the main portion 71 is stopped at the extended portion 73. In other words, the extended portion 73 is made to be an ending point of film F pressing by the application unit 11. As described above, when applying the film to the base material by pressing the film with a tool or the like, the shock line is more likely to be generated at the starting point and the ending point of this pressing. On this point, with the present application method, because the extended portion 72 is made to be the starting point of pressing and the extended portion 73 is made to be the ending point of pressing, by applying the main portion 71 to the base material B and pressing (or applying) the extended portions 72, 73 to the extension parts 60 that are other portions, the shock line can be suppressed from being generated at a portion of the film F that will be made into a product. From the above, according to the present application method, the application quality of the film F can be improved.

Further, the extended portions 72, 73 are continuously connected to the main portion 71. In this embodiment, the extended portions 72, 73 are continuously connected to the main portion 71 by connecting the slit portions 74x, 74y of the film main body 70a by the application film 70c. For example, when the film is not continuously connected, the shock line is more likely to be generated in a periphery of a location that is not continuously connected when the film is pressed by the tool or the like. On this point, by the extended portions 72, 73 and the main portion 71 being continuously connected, the shock line can be suppressed from being generated during pressing.

Further, at the first end 71x and the second end 71y, which are the boundary regions between the extended portions 72, 73 and the main portion 71 in the film main body 70a, the slit portions 74x, 74y that extend in the Y-axis direction are formed. By such slit portions 74x, 74y being formed, a portion applied to the base material B and a portion applied to the extension part 60 from among the main body portion of the film F can be easily cut away.

Further, the base material B extends in the X-axis direction that is the horizontal direction, and in the process of applying the film F to the base material B, the main portion 71 is applied to the base material B in the X-axis direction by the application unit 11 moving in the X-axis direction. By this, the work of application can be performed while placing the base material B on a horizontal surface and workability can be improved.

Second Exemplary Embodiment

Figure 7A:
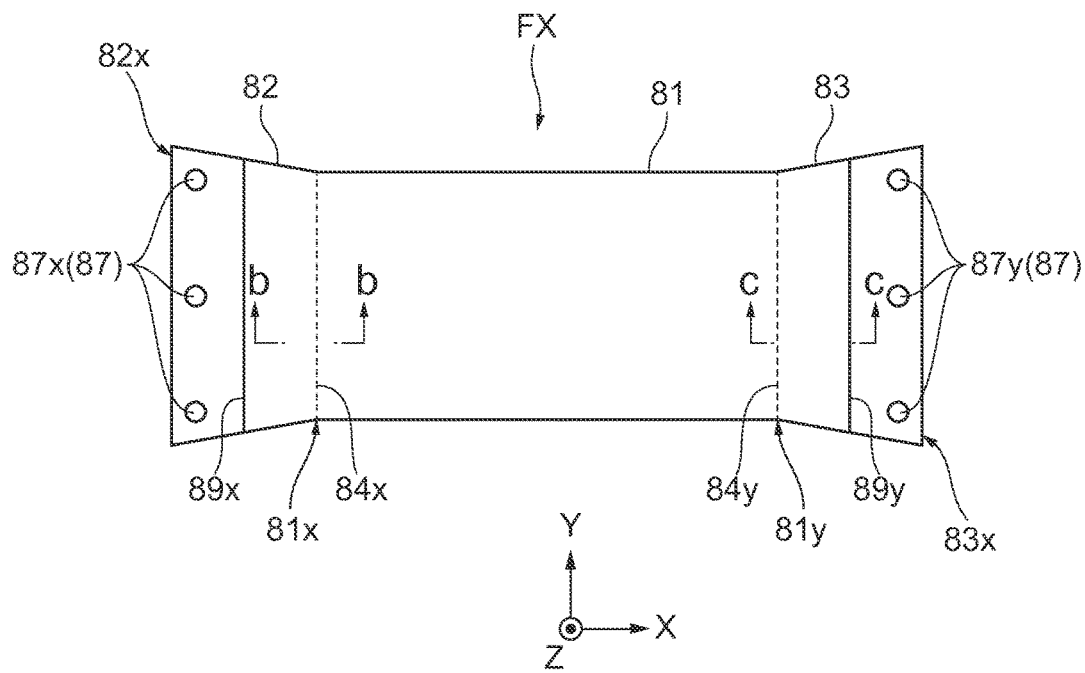
FIG. 7a is a plan view of a film of a second embodiment.

A film according to a second embodiment will be described with reference to FIGS. 1 to 6 as well as FIG. 7. As illustrated in FIG. 7A, a film FX is, similarly to the film F according to the first embodiment, provided with: a main portion 81 of a rectangular shape; an extended portion 82 (first extended portion) of a trapezoidal shape continuously connected to a first end 81x in a longitudinal direction of the main portion 81 (end portion on the X-axis direction negative side in the main portion 81); and an extended portion 83 (second extended portion) of a trapezoidal shape continuously connected to a second end 81y in the longitudinal direction of the main portion 81 (end portion on the X-axis direction positive side in the main portion 81). Near both ends in the X-axis direction of the film FX, hole portions 87 to be fitted to the projecting portion 31x are formed. In other words, near an end portion 83x of the extended portion 83, a hole portion 87y to be fitted to the projecting portion 31x of the gripping plate 31 is formed. Further, a hole portion 87x to be fitted to the projecting portion 31x of the gripping member 91 (see FIG. 5) is formed in an end portion 82x of the extended portion 82.

With the film FX, the main portion 81 is pressed against the base material B by receiving the pressing force from the application unit 11. Further, the extended portion 82 receives the pressing force from the application unit 11 prior to the main portion 81 and is pressed against the first extension part 60a. Further, the extended portion 83 receives the pressing force from the application unit 11 after the main portion 81 and is pressed against the second extension part 60b.

While the film F of the first embodiment described above is made to be of the three-layer structure, the film FX of this embodiment is of the two-layer structure that does not have the application film. In other words, the film FX is configured including a film main body 80a having an adhesive surface 80x that can be applied to the base material B or the like and a peeling sheet 80b disposed so as to oppose the adhesive surface 80x (lower surface) of the film main body 80a. The film main body 80a has the adhesive surface 80x, which is configured by an acrylic adhesive or a urethane adhesive, and a decorative surface 80y configured by polyvinyl chloride or a silicone resin.

Figure 7B:
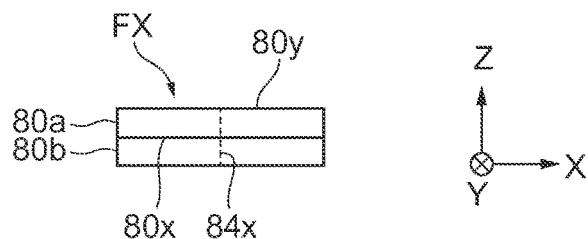
Figure 7C:
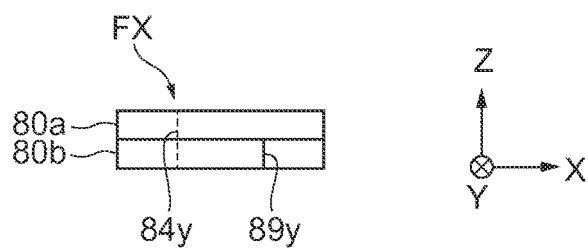

Here, as illustrated in FIGS. 7a to 7c, a perforated portion 84x (separation portion) is formed at the first end 81x, which is a boundary region between the extended portion 82 and the main portion 81. Similarly, a perforated portion 84y (separation portion) is formed at the second end 81y, which is a boundary region between the extended portion 83 and the main portion 81. In the perforated portions 84x, 84y, a plurality of holes is formed at predetermined intervals along the Y-axis direction. The holes of the perforated portions 84x, 84y are formed so as to penetrate both the film main body 80a and the peeling sheet 80b. The intervals between the holes formed in the perforated portions 84x, 84y are not limited in particular but are preferably narrowed to an extent where the extended portions 82, 83 and the main portion 81 can be separated by human power. From the above, in this embodiment, by the perforated portions 84x, 84y being formed in the film main body 80a as the separation portion, the extended portions 82, 83 and the main portion 81 are continuous and connected in the film main body 80a. By this, the extended portions 82, 83 are continuously connected to the main portion 81. Note that the holes of the perforated portions 84x, 84y may be formed so as to penetrate only the film main body 80a.

Further, a slit portion 89x of a slit shape extending in the Y-axis direction is formed in the extended portion 82. Similarly, a slit portion 89y of a slit shape extending in the Y-axis direction is formed in the extended portion 83. The slit portions 89x, 89y are formed only in the peeling sheet 80b and are not formed in the film main body 80a.

An application method of the film FX using the application device 1 is roughly similar to the application method of the film F described in the first embodiment. As described above, the film FX differs from the film F, which is of the three-layer structure, in that it is of the two-layer structure. Only processes in the application method differing from those of the first embodiment will be described.

As a final process of the preliminary preparation for pressing the film, in this embodiment, the peeling sheet 80b in a section from the slit portion 89x to the slit portion 89y is peeled from the adhesive surface 80x of the film main body 80a. In this state, the main portion 81, a location closer to the main portion 81 than the slit portion 89x of the extended portion 82, and a location closer to the main portion 81 than the slit portion 89y of the extended portion 83 are of a single-layer structure. Further, a location closer to the end portion 82x than the slit portion 89x of the extended portion 82 and a location closer to the end portion 83x than the slit portion 89y of the extended portion 83 are of a two-layer structure. Further, because the film FX does not have the application film, the process of peeling the application film after the separating process is completed is unnecessary. Because of this, after the separating process, only the process of cutting away the film main body 80a of the extended portions 82, 83 from the film main body 80a of the main portion 81 at the perforated portions 84x, 84y is performed.

The foregoing has been a detailed description of the present invention with respect to embodiments thereof. However, the present invention is not limited to the above embodiment, and various changes are possible without departing from the gist thereof.

Figure 8A:
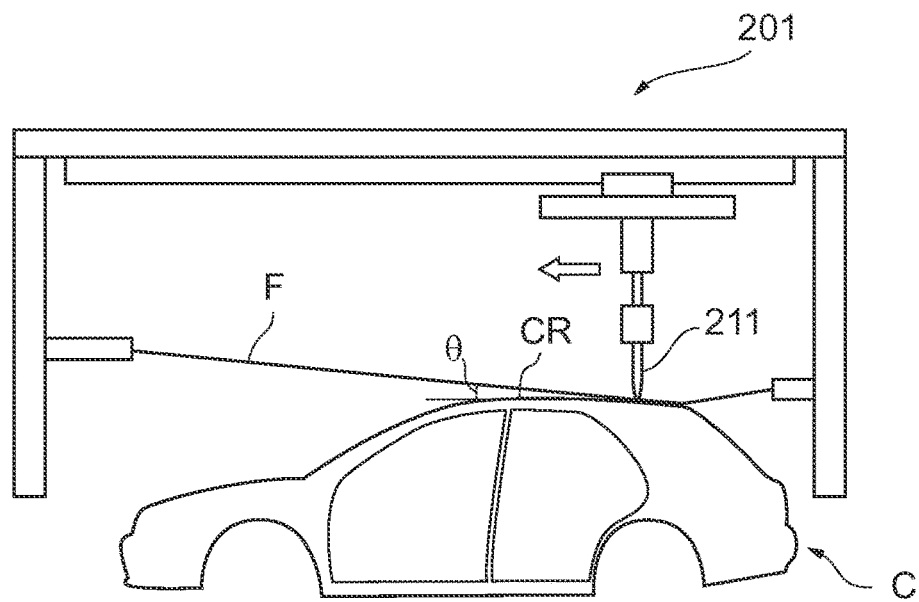
FIGS. 8a and 8b are schematic views of an application device according to a modified example.
Figure 8B:
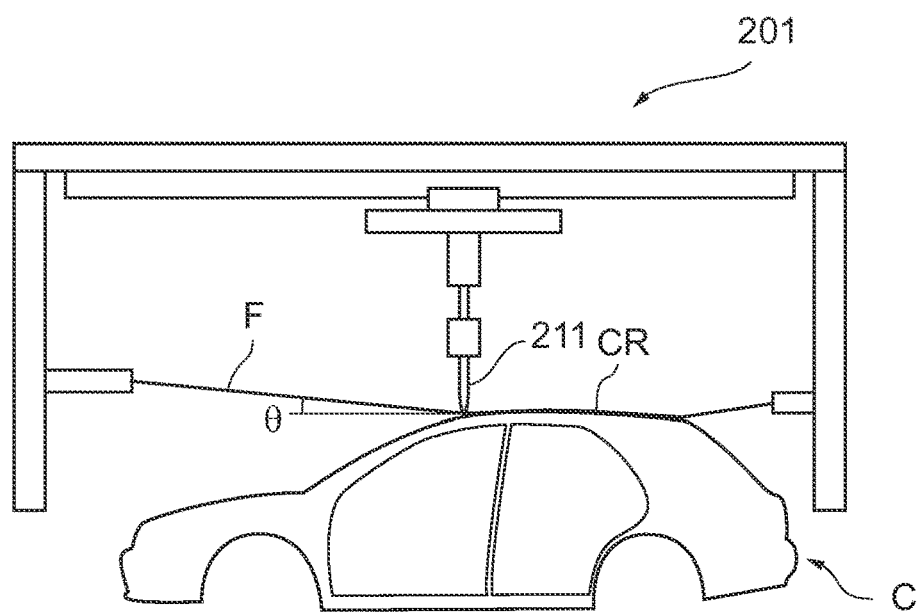

For example, the description provided in the above embodiments were of films F, FX applied to a base material B placed on a table 41, but the configuration is not limited thereto, and as with the application device 201 illustrated in FIG. 8, the application unit 211 may apply the film F to a base material of a size that cannot be placed on a table, for example, a roof portion CR (ceiling portion) of a vehicle C. Note that, also in this case, the angle formed by the film F prior to pressing and the roof portion CR, which is the base material, preferably forms a substantially constant angle θ from the pressing start time (see FIG. 8a) to the pressing end time (see FIG. 8b). Note that a base material of a size that cannot be placed on the table is not limited to a roof portion of a vehicle, and all varieties of articles, such as members of airplanes, ships, and buildings, can be considered.

Further, the film is described as being of the three-layer structure or the two-layer structure but is not limited thereto and may be of a single-layer structure or a four-layer structure. Further, examples of the slits and the perforated shapes are described as the separation portion, but the separation portion is not limited thereto as long as a portion applied to the base material in the film and other portions can be separated. Further, the separation portion does not have to be present in the film. At least after applying the main portion to the base material, a cutting process for cutting the extended portion from the main portion using a cutting tool may be implemented.

Further, the application mechanism of the application device is not limited to the application mechanism 10 described above and may be an application mechanism described below. Variations of the application mechanism will be described with reference to FIGS. 9 to 11.

Application mechanisms 100 and 150 of an application device according to a modified example will be described with reference to FIG. 9 and FIG. 10. The application mechanism 100 and 150 have adjustment mechanism 110 and 160 that can adjust the angle of the application unit 111 and 161 relative to the base material. When this type of adjustment mechanism 110 and 160 is used, the film F can be applied without generation of creases, wrinkles, and the like even when the bonding surface is a three-dimensional curved surface that curves not only along the second direction but also along the first direction.

Figure 9A:
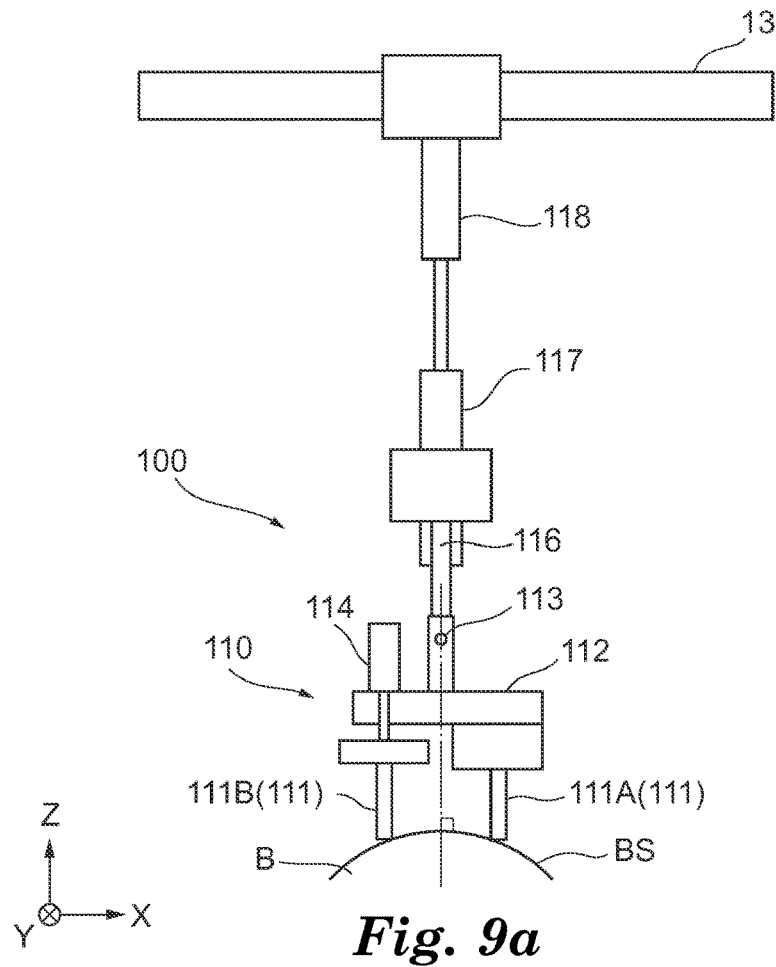
FIGS. 9a and 9b are schematic views of an application mechanism according to a modified example.

Specifically, as illustrated in FIG. 9, the adjustment mechanism 110 of the application mechanism 100 is provided with a pair of application units 111 (application unit 111A and 111B) that are opposed to each other in the X-axis direction, a support member 112 that supports the application units 111A and 111B, a movable arm 116, and drive units 114 (corresponding to 12b) and 118 (corresponding to 12a) that drive the application unit 111 in the Z-axis direction. For example, an air cylinder can be employed as the drive unit 114, and a single axis robot can be employed as the drive unit 118, but these are not limited thereto as long as they can drive in the Z-axis direction. While the application unit 111A is fixed to the support member 112, the application unit 111B is configured to expand and contract relative to the support member 112 by being applied a driving force from the drive unit 114. The support member 112 is coupled to the bottom end portion of the movable arm 116 via the shaft 113. The support member 112 is coupled rotatably about the shaft 113

Figure 9B:
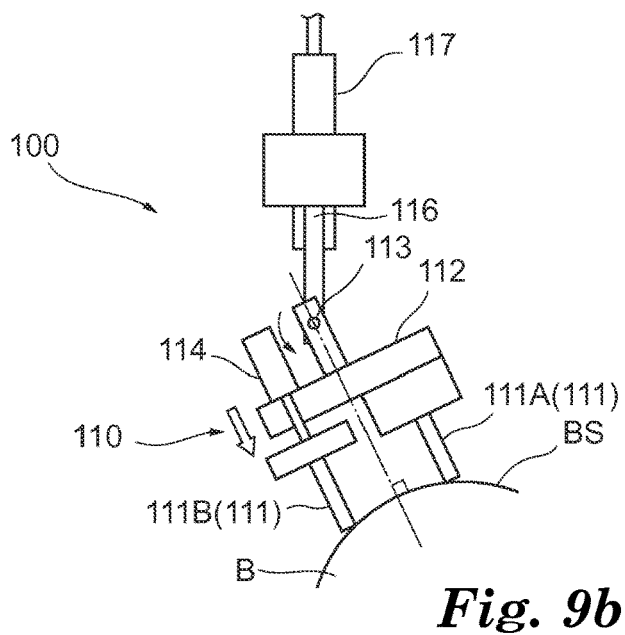

According to the configuration as described above, the adjustment mechanism 110 can adjust an angle relative to the base material of the application units 111A and 111B according to the shape of the bonding surface BS of the base material. Specifically, the adjustment mechanism 110 performs adjustments so that both application units 111A and 111B maintain contact with the bonding surface BS (via the film F). In other words, as illustrated in FIG. 9b, when the shape of the bonding surface BS changes along the X-axis direction, a positional adjustment is made by the drive units 114 and 118 so that the application unit 111A maintains contact with the bonding surface BS. Furthermore, a configuration in which the application units 111A and 111B can expand and contract may also be employed so that the application units 111A and 111B maintain contact with the bonding surface BS by the drive mechanism 117 that drives the application unit 111 in the Z-axis direction. A single axis robot may be employed as the drive unit 117, but the configuration is not limited to this as long as it can drive in the Z-axis direction. Driving the application unit 111 on the Z-axis direction negative side with the driver unit 118 causes the support member 112 to rotate about the shaft 113 while the application unit 111A is in contact with the bonding surface BS. At this time, minute adjustments displacing in the Z-axis direction may be made by the drive unit 117 according to the rotation about the shaft 13 by the support member 112. Further, the drive unit 114 performs minute adjustments in the position of the application unit 111B so that the application unit 111B contacts the bonding surface BS. By this, even if the shape of the bonding surface BS changes along the X-axis direction, the incident angle relative to the base material of the application units 111A and 111B can be substantially constant. Making the incident angle of the application units 111A and 111B relative to the base material to be substantially constant in this manner allows the shape of the intersecting lines of the bonding surface BS and the film F pressed by the application units 111A and 111B to be held substantially constant. Note that the drive unit 118 may demonstrate a function of the drive unit 117.

Figure 10A:
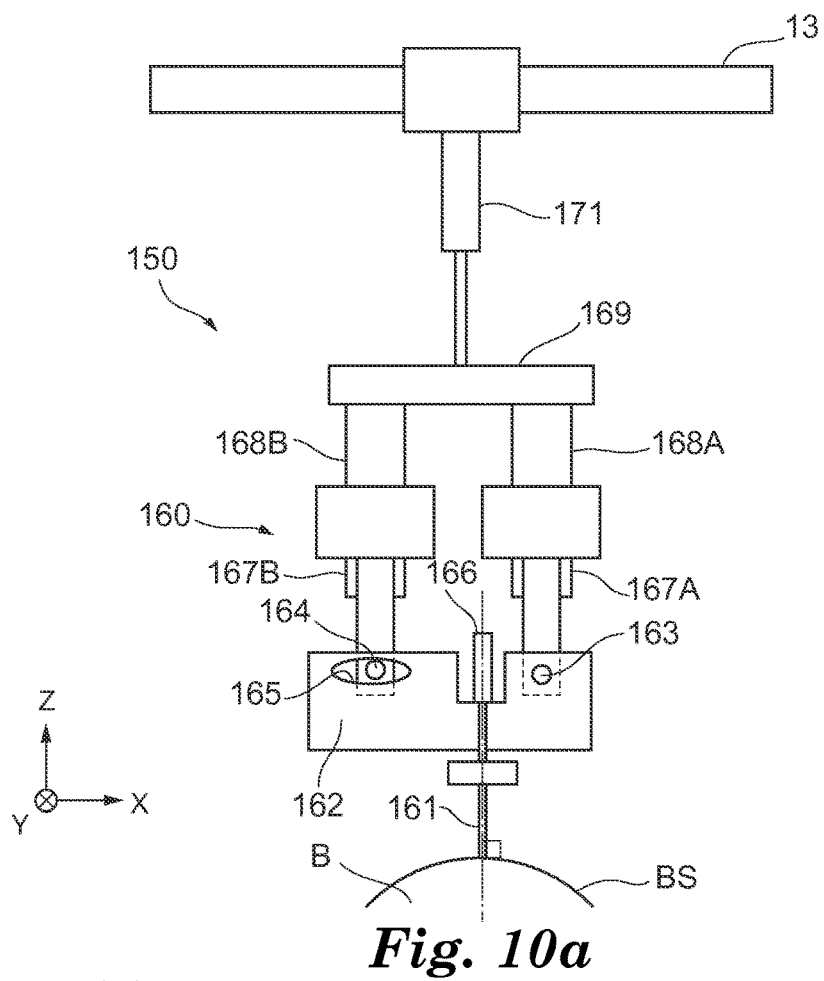
FIGS. 10a and 10b are schematic views of an application mechanism according to a modified example.

Further, as illustrated in FIG. 10, the adjustment mechanism 160 of the application mechanism 150 is provided with an application unit 161, a support member 162 that supports the application unit 161, a drive unit 166 that drives the application unit 161 in the Z-axis direction, movable arms 167A and 167B connected to the support member 162, drive units 168A and 168B that drive the movable arms 167A and 167B in the Z-axis direction, a support member 169 that supports the drive units 168A and 168B, and a drive unit 171 that drives the support member 169 in the Z-axis direction. For example, a single axis robot may be employed as the drive units 168A, 168B, and 171, and an air cylinder may be employed as the drive unit 166, but configurations are not limited to these as long as they can drive in the Z-axis direction. The application unit 161 is configured to be able to expand and contract relative to the support member 162 by a driving force being applied from the drive unit 166. The support member 162 is coupled to the bottom end portion of the movable arm 167A via the shaft 163. The support member 162 is coupled rotatably about the shaft 163. Further, the support member 162 is coupled to the bottom end portion of the movable arm 167B via the shaft 164. An elongated hole 165 is formed in the support member 162 for the shaft 163 to pass through. The coupling position of the support member 162 and the shaft 164 can be corrected by the elongated hole 165.

Figure 10B:
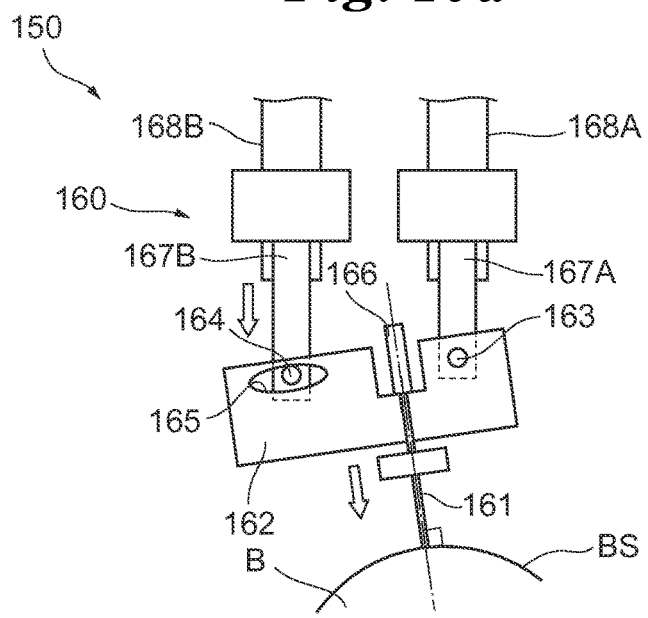

According to the configuration as described above, the adjustment mechanism 160 can adjust an angle relative to the base material of the application unit 160 according to the shape of the bonding surface BS of the base material. Specifically, the drive unit 171 and the drive units 168A and 168B adjust the position of the application unit 161 via the support member 162 by receiving signals from the controller not illustrated. At this time, when there is a difference in the expansion and contraction amounts between the drive unit 168A and the drive unit 168B, the support member 162 rotates about the shaft 163 as illustrated in FIG. 10b. At this time, because the shaft 164 slides along the elongated hole 165, the rotation of the support member 162 is not inhibited. Further, the drive unit 166 performs minute adjustments in the position of the application unit 161 so that the application unit 161 contacts the bonding surface BS. By this, even if the shape of the bonding surface BS changes along the X-axis direction, the shape of the intersecting lines of the bonding surface BS and the film F pressed by the application unit 161 can be held to be substantially constant by making the incident angle relative to the base material of the application unit 161 be substantially constant. Note that, the drive unit 171 may not necessarily be provided, and the drive units 168A and 168B may perform the function of the drive unit 171 by driving further in the Z-axis direction.

Figure 11:
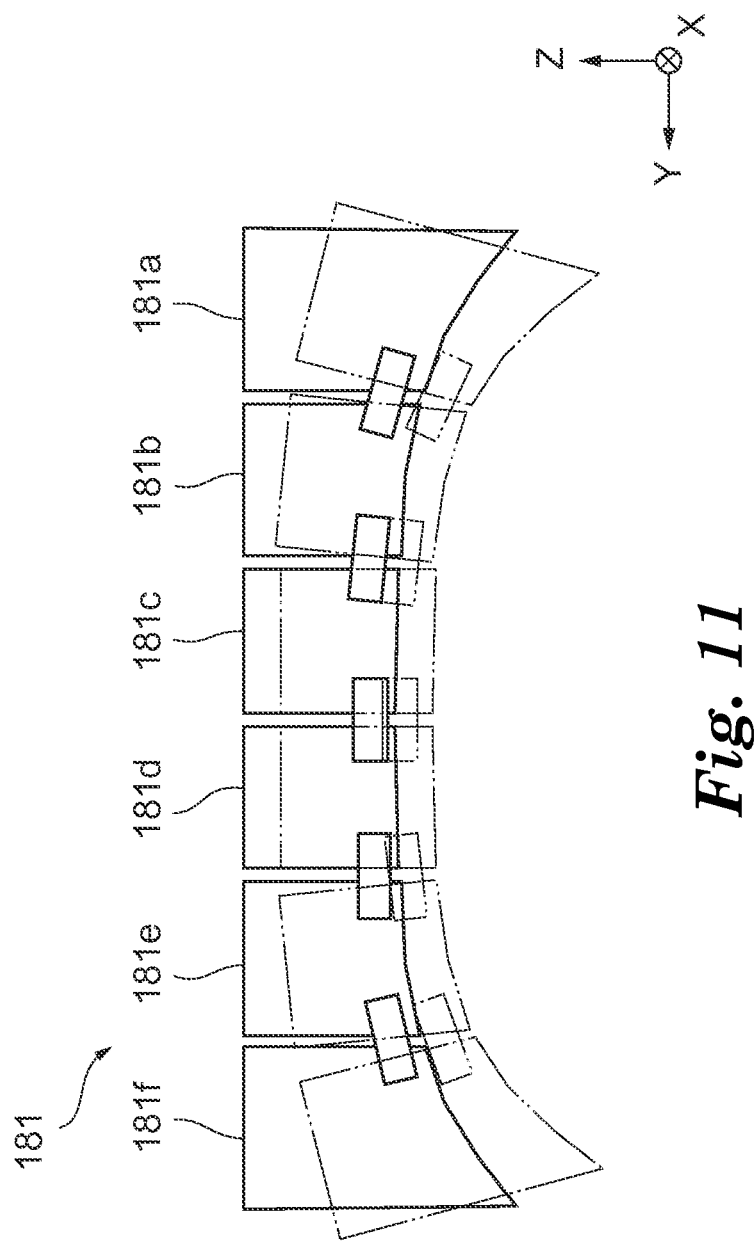
FIG. 11 is a schematic view of an application mechanism according to a modified example.

Further, as illustrated in FIG. 11, the application unit 181 of the application device is split into, for example, six split sections 181a, 181b, 181c, 181d, 181e, and 181f along the Y-axis direction. Providing a large number of splits, for example six or the like, in the application unit 181 allows for a larger number of independently drivable configurations that makes it easier to correspond to a shape of the base material B (bonding surface BS). In other words, the application unit 181 can be formed into a shape that corresponds to the base material B by independently driving each of the split sections 181a, 181b, 181c, 181d, 181e, and 181f even when the base material B curves in the Y-axis direction such as when there is a large curvature in the curving shape. Moreover, the application unit 181 can be formed into a shape that corresponds to the base material B by independently driving each of the split sections 181a, 181b, 181c, 181d, 181e, and 181f even when the base material B curves in the X-axis direction.

What is claimed is:

1. A method of applying a film to a base material having a bonding surface along a first direction which is an extending direction of the base material, the method comprising the steps of:

preparing a film having a main portion extending to the first direction, a first extended portion continuously connected to a first end of the main portion in the first direction, and a second extended portion continuously connected to a second end opposing the first end in the main portion, the film further including a separation portion extending along a boundary region between the main portion and the first or second extended portion, wherein the separation portion comprises a slit portion or a perforated portion;

preparing an application device having a pressing unit, a film gripping part that grips the first extended portion of the film, and a second film gripping part that grips the second extended portion of the film, wherein the second gripping part can be driven in a second direction which is a direction orthogonal to the bonding surface;

pressing the first extended portion using the pressing unit;

applying the main portion to the base material by moving the pressing unit that presses the first extended portion from the first extended portion to the second extended portion via the main portion and by moving the pressing unit in the first direction relative to the base material stopping the pressing unit moved to the second extended portion and separating the pressing unit from the first or second extended portion, and with the main portion applied to the base material, separating the main portion from the first or second extended portion along the slit portion or a perforated portion of the separation portion of the film.

2. The method according to claim 1, wherein the base material is a ceiling portion of a vehicle.

3. The method according to claim 1, wherein the base material extends in a horizontal direction, and in the applying step, the main portion is applied to the base material in the horizontal direction by the pressing unit moving in the horizontal direction.

4. The method of claim 1, wherein an angle formed by the film and the base material is substantially constant from a pressing start time to a pressing end time.

* * * * *

UNITED STATES PATENT AND TRADEMARK OFFICE
CERTIFICATE OF CORRECTION

PATENT NO. : 10,661,544 B2  
APPLICATION NO. : 15/124777  
DATED : May 26, 2020  
INVENTOR(S) : Masayuki Kubota Page 1 of 1

It is certified that error appears in the above-identified patent and that said Letters Patent is hereby corrected as shown below:

<u>Column 18</u>  
Lines 66-67, in Claim 1, after "comprises" delete "a slit portion or".

<u>Column 19</u>  
Line 18, in Claim 1, after "the" delete "slit portion or a".

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*